US010328539B1

(12) United States Patent
Alabdulkarim

(10) Patent No.: US 10,328,539 B1
(45) Date of Patent: Jun. 25, 2019

(54) ASSISTIVE DEVICE FOR HEAVY TOOL OPERATION

(71) Applicant: KING SAUD UNIVERSITY, Riyadh (SA)

(72) Inventor: Saad Abdulmohsen M. Alabdulkarim, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/196,201

(22) Filed: Nov. 20, 2018

(51) Int. Cl.
*B23Q 3/02* (2006.01)
*B23Q 3/04* (2006.01)
*B62B 5/00* (2006.01)
*B62B 3/10* (2006.01)

(52) U.S. Cl.
CPC ............... *B23Q 3/04* (2013.01); *B62B 3/10* (2013.01); *B62B 5/00* (2013.01); *B62B 5/0083* (2013.01)

(58) Field of Classification Search
CPC ... B23Q 3/04; B23Q 3/16; B23Q 1/76; B23Q 1/766; B25J 5/007
See application file for complete search history.

(56) References Cited

U.S. PATENT DOCUMENTS

| 3,572,199 | A | * | 3/1971 | Harden | ............... | B23D 45/12 |
| | | | | | | 266/57 |
| 4,412,401 | A | * | 11/1983 | Fundell | ............ | B23D 45/044 |
| | | | | | | 266/57 |
| 4,802,801 | A | * | 2/1989 | Fengler | ............... | B23Q 1/76 |
| | | | | | | 409/168 |
| 6,752,221 | B1 | * | 6/2004 | Morissette | ........... | B25D 17/28 |
| | | | | | | 173/193 |
| 6,854,314 | B2 | * | 2/2005 | Cleave | .............. | B21D 5/04 |
| | | | | | | 144/286.1 |
| 7,059,616 | B2 | * | 6/2006 | Wu | ................... | B25H 1/04 |
| | | | | | | 108/117 |
| 8,401,702 | B2 | * | 3/2013 | Okazaki | ............ | A61G 7/1017 |
| | | | | | | 700/257 |
| 8,464,994 | B2 | * | 6/2013 | Chiu | ..................... | B25H 1/04 |
| | | | | | | 144/286.1 |
| 9,554,964 | B1 | | 1/2017 | Johnson et al. | | |

(Continued)

FOREIGN PATENT DOCUMENTS

| CN | 108058155 A | 5/2018 |
| WO | 2016051081 A1 | 4/2016 |
| WO | 2018165399 A1 | 9/2018 |

OTHER PUBLICATIONS

Wang et al., "Stability analysis of electrical powered wheelchair-mounted robolic-assist transfer device," Journal of rehabilitation Research & Development (JRRD), vol. 51, No. 5, 2014, pp. 761-744.

Primary Examiner — Bradley Duckworth
(74) Attorney, Agent, or Firm — Richard C. Litman

(57) ABSTRACT

An assistive device for heavy tool operation includes a rectangular frame and four legs extending from the corners of the frame. A tool base can extend through a slot in the frame. The tool base is configured to support a mechanical support arm and tool. A height and horizontal position of the tool base relative to the frame is adjustable. Each leg is connected to a wheel to allow the assistive device to travel with a user. The assistive device can support a majority, if not all, of the weight of an attached heavy tool and mechanical support arm, while allowing the user to operate the tool and adjust its position with minimal applied force.

15 Claims, 4 Drawing Sheets

(56) References Cited

U.S. PATENT DOCUMENTS

| | | | | |
|---|---|---|---|---|
| 2005/0023015 A1* | 2/2005 | Argento | ............ | B25D 17/28 |
| | | | | 173/36 |
| 2015/0001269 A1* | 1/2015 | Sacksteder | ............ | B25J 9/0006 |
| | | | | 224/576 |
| 2015/0016923 A1* | 1/2015 | Brown | ............ | A61F 5/01 |
| | | | | 414/1 |
| 2017/0217009 A1* | 8/2017 | Angold | ............ | B25H 1/0042 |
| 2018/0290290 A1* | 10/2018 | Uchiyama | ............ | B25H 1/04 |

* cited by examiner

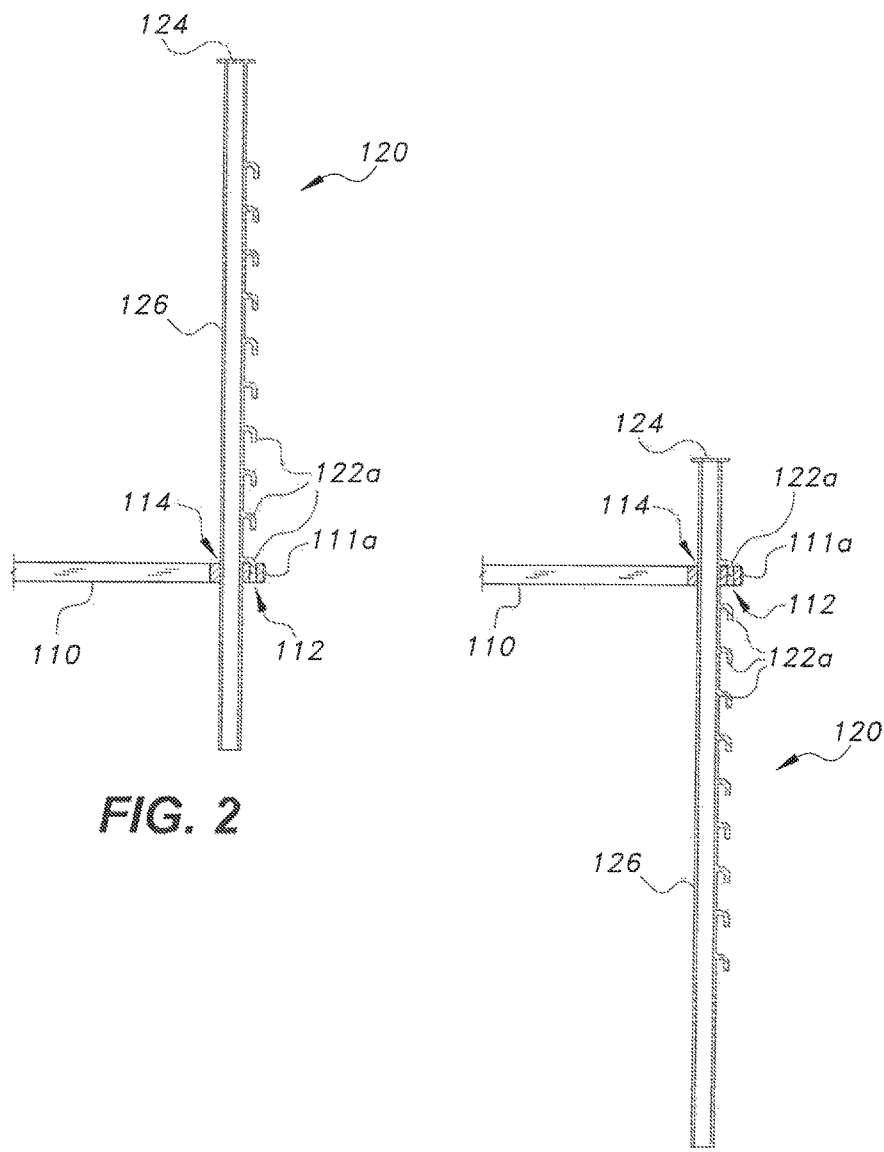

US 10,328,539 B1

ASSISTIVE DEVICE FOR HEAVY TOOL OPERATION

BACKGROUND

1. Field

The disclosure of the present patent application relates to lifting assist devices for humans, and particularly, to an assistive device for heavy tool operation.

2. Description of the Related Art

Working overhead or working while reaching up with one or more arms is a well-known cause of occupational injuries, such as shoulder joint injury. In the United States, shoulder injuries caused more missed work days than other occupational injuries in 2015. Generally, when occupational tasks are physically demanding, one solution is to use automation as an engineering control. However, this strategy can be impossible and/or very expensive. An alternative approach is to use assistive devices, such as mechanical manipulators and wearable exoskeletons, in the workplace. Assistive devices can be useful for a wide range of tasks, require little to no change to workplace structures, and are less expensive.

When whole body exoskeletons are used, the carried load is transferred to the ground through structures fixed to the wearer's lower body. This can lead to excessive strain on the operator's legs and lower back, causing the operator to lose balance and fall. As a result, whole body exoskeleton devices can reduce both postural stability and task performance.

Thus, an assistive device for heavy tool operation solving the aforementioned problems is desired.

SUMMARY

An assistive device for heavy tool operation includes a rectangular frame and four legs extending from the corners of the frame. The rectangular frame is defined by four side members and includes an open space between the side members. A first side member includes a rectangular slot extending along a length thereof and a plurality of holes defined along the slot. The holes are spaced from the slot. A tool base can extend through a slot in the frame. The tool base includes a shaft and lockers extending from the shaft. The tool base can be secured within the slot by inserting one of the lockers in one of the holes. Each leg is connected to a wheel to allow the assistive device to travel with a user.

The tool base is configured to support a mechanical support arm and tool. A height and horizontal position of the tool base relative to the frame is adjustable. The assistive device supports a majority, if not all, of the weight of an attached heavy tool and mechanical support arm, while allowing the user to operate the tool and adjust its position with minimal applied force.

These and other features of the present disclosure will become readily apparent upon further review of the following specification and drawings.

BRIEF DESCRIPTION OF THE DRAWINGS

FIG. 2 is a sectional, side view of the frame and tool base of the assistive device with the tool base at a highest position.

FIG. 3 is a sectional, side view of the frame and tool base of the assistive device with the tool base at a lowest position.

Similar reference characters denote corresponding features consistently throughout the attached drawings.

DETAILED DESCRIPTION OF THE PREFERRED EMBODIMENTS

Figure 1:
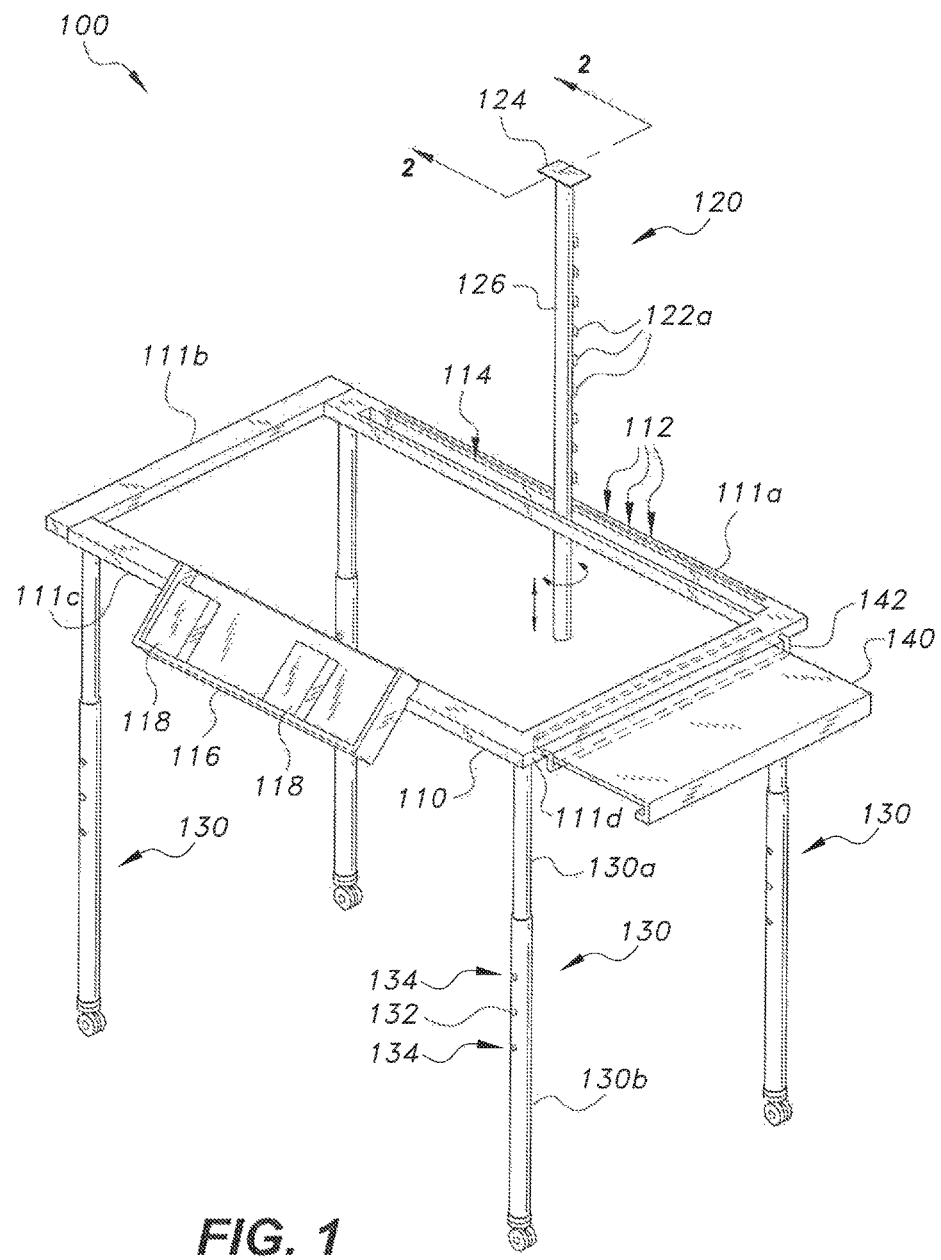
FIG. 1 is a perspective view of the assistive device for heavy tool operation in an operational configuration.

An assistive device for heavy tool operation 100 is shown in FIG. 1. The assistive device for heavy tool operation 100 includes a rectangular frame 110 and four legs 130 extending from the corners of the frame 110. The rectangular frame 110 includes first and second parallel side members 111a, 111c, and third and fourth parallel side members 111b, 111d extending between and connecting side members 111a and 111c. Side members 111a and 111c can have a greater length than side members 111b and 111d. First side member 111a includes a slot 114 extending substantially along a length thereof. A tool base 120 extends through the slot 114, normal to the side member 111a. As described in detail herein, a height and horizontal position of the tool base 120 relative to the side member 111a can be adjustable. A tool mount 124, for mounting a mechanical arm to support a heavy tool extends from a top edge of the tool base 120. Each leg 130 is supported by a wheel 136 to allow the assistive device 100 to follow a user during operation. The assistive device 100 supports a majority, if not all, of the weight of the attached heavy tool and mechanical support arm, while allowing the user to operate the tool and adjust its position with minimal applied force.

The assistive device for heavy tool operation 100 is designed to support a passive tool holding arm, and attached heavy tool, to reduce the load carried by an operator of the tool. The passive tool holding arm can connect to the tool mount 124 on top of the tool base 120 to allow an operator to steadily hold and accurately move the tool around without carrying the tool. The arm may be any passive tool holding arm known in the art, such as the passive tool holding arm sold under the tradename ZERO G ERGONOMIC TOOL ARM by Sigma Ergonomics. The tool base 120 can be secured to a lower end of the passive arm. The arm can then be used to support a tool and, thereby, minimize the force necessary to operate the tool. The passive tool holding arm may completely support the weight of the tool, requiring the user to exert force only when changing the position of the tool. An active tool holding arm, which may use hydraulic or electrical power, may alternatively be attached to the tool mount.

The tool base 120 is vertically and horizontally adjustable with respect to the frame 110 of the assistive device 100. This adjustability allows an operator to adjust the horizontal position and height of the tool mount 124. The height and horizontal location of the mount 124 may be selected by the operator based on the task being completed. For example, the tool mount 124 may be set to the higher vertical position for a job that requires overhead drilling and has a short passive tool holding arm. When the location to be accessed by the tool is too narrow to accommodate the frame 110, the tool base 120 may be shifted horizontally to an end of the assistive device 100 for extending the reach of the tool. When a tool is mounted to a long passive arm, the operator may set the tool base 120 to a horizontally central position and medium height since the arm will allow for a large tool working radius.

Although the tool mount 124 at the top of the tool base 120 is shown as a flat plate or support surface in the figures, the tool mount 124 may have any suitable configuration for mounting the intended device. For example, a quick release adapter that can accommodate multiple tools may be used as the tool mount.

As shown in FIGS. 2-5, the first side member 111a can include a plurality of horizontal adjustment holes 112 alongside the rectangular slot 114. A shaft 126 of the tool base 120 extends through the rectangular slot 114 and is capable of moving horizontally and vertically within the slot 114. A plurality of base hooks or lockers 122 extend from the base shaft 126. The lockers 122 are configured to fit within any one of the horizontal adjustment holes 112. The lockers can include a bended portion, e.g., a bend that forms a right angle. Once a single locker 122 is secured within a selected hole 112, the tool base 120 is locked in place. To adjust a height of the tool mount 124, a different base locker 122 can be inserted into the selected horizontal attachment hole 114. To adjust a horizontal position of the tool mount 124, the selected base locker 122 can be inserted into a different horizontal attachment hole 114.

The base lockers 122 shown in the embodiment of FIGS. 1-3 are rigidly attached to an outer surface of the tool base shaft 126. The position of the tool base 120 can be adjusted by lifting the tool base 120 to remove the base locker 122 from the horizontal position hole 112 and rotating the tool base 120 90 degrees, or such that the lockers 122 are aligned with the slot 114 and can be moved therethrough. In this position, the tool base 120 can be easily moved in horizontal and vertical directions within the rectangular slot 114. When the tool base 120 is at a desired horizontal and vertical position, the tool base 120 can be rotated back into a locking orientation, such that a selected one of the lockers 122 is in alignment with a selected one of the holes 112. The base locker 120 can then be inserted into the horizontal position hole 112 to lock the tool base 120 in place.

FIGS. 2 and 3 depict the height adjustability of the tool base 120 relative to the rectangular frame 110. In FIG. 2, the lowest base locker 122 on the tool base 120 is inserted into a position hole 112. This sets the tool base 120 at the highest setting. FIG. 3 shows the highest base locker 122 inserted into the horizontal position hole 112, thus setting the tool base 120 at its lowest setting. Intermediate heights are set by selecting the appropriate base locker 122.

Figure 4:
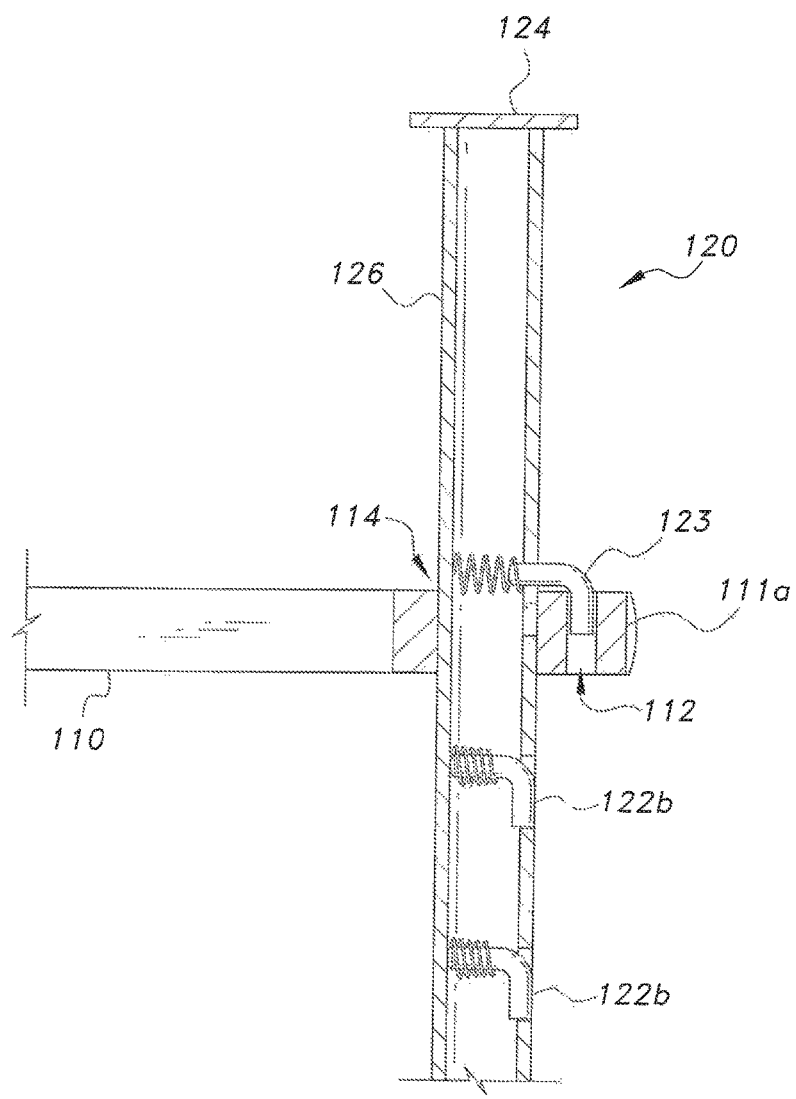
FIG. 4 is a sectional side view of the assistive device, showing a second embodiment of base lockers.

An alternative embodiment of a base locker 123 is shown in FIG. 4. Unlike the base locker 122, the base locker 123 is retractable or capable of moving into and out of the tool base shaft 126. In an embodiment, each base locker 123 includes a compressible spring within the shaft 126. The spring can be extended to permit the locker 123 to extend out of the shaft 126 and compressed to allow the locker 123 to be stored within the shaft 126. For example, the lockers 123 can be stored within the shaft 126 when moving the shaft 126 through the slot. As such, the position of the tool base 120 can be adjusted without rotating the tool base 120.

The legs 130 can be adjustable to facilitate adjusting the height of the rectangular frame 110. Each leg 130 can include an outer member 130b and an inner member 130a slidably connected to the outer member 130b. The extent of overlap between the members 130a, 130b determines the height of the leg 130. For example, a large overlap results in a short leg 130 while a minimal overlap results in a long leg 130. The leg 130 height is locked in place using longitudinally spaced holes 134 on the outer member 130b and a spring loaded pin 132 on the inner member 130a. When the pin 132 is pressed in by an operator, the inner member 130a and out member 130b are able to slide freely. When the pin 132 is released, the pin 132 can extend within a hole 134. It should be understood that other suitable height adjustment mechanisms known in the art can be used for adjusting the height of the legs 130.

The second side member 111c of the rectangular frame 110 includes a counterbalancing weight base 116 to support one or more weight blocks 118 thereon. The counterbalancing weight base 116 can be inclined from the second side member 111c. The counterbalancing weight base 116 is designed to counter balance any weight imbalances created by the tool base 120 and attached tools. Since the arm and tool attached to the tool base 120 can have a significant weight relative to the assistive device 100, there is a possibility of the localized weight causing the assistive device 100 to tip or lose stability. The risk of tipping is increased when the operator extends the tool out past the edge of the rectangular frame 110. Weight blocks 118 can be added to or removed from the counterbalancing weight base 116 to counter the effects of varying amounts of weight. The number of weight blocks 118 can be selected based on the weight of the tool and arm, the height in which the tool arm will be operated, and the distance from the edge of the rectangular frame 110 at which the tool arm will be operated.

Figure 5:
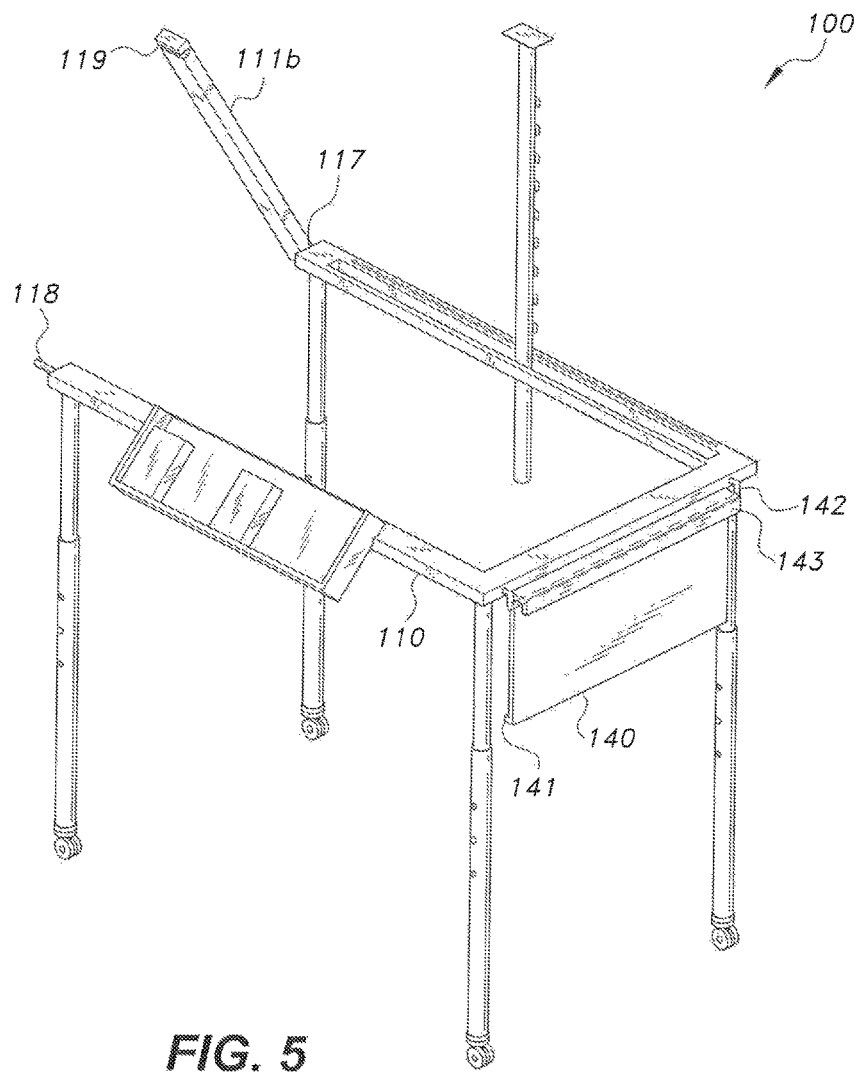
FIG. 5 is a perspective view of the assistive device for heavy tool operation in a non-operational configuration.

In an embodiment, third side member 111b can be pivotally attached to the first side member 111a or second side member 111c. Pivoting side member 111b can be pivoted up and out of the way so the operator can walk into and out of the open space within the frame of the assistive device 100, as seen in FIG. 5. Once within the open space of the frame 110, the operator can pivot the pivoting side member 111b down and secure the side member 111b to the remainder of the frame 110. A hinge or any other suitable pivoting mechanism known in the art may be used to facilitate pivoting of the side member 111b. Similarly, any suitable locking mechanism can be used to secure the side member 111b to the frame 110. In an embodiment, a pin 118 extends from an end of the second side member for selectively inserting in a groove 119 of the pivoting side member 111b.

Fourth side member 111d may include a foldable table 140 to hold tools and hardware not in immediate use by the operator. A generally U-shaped support bar 142 can be attached to side member 111d. The table 140 may include slots, indentations, and/or channels to store and organize hardware. In an embodiment, the table includes a shelf 141 extending normal to a first edge of the table 140 and a hook 143 extending normal to a second edge of the table 140. When the table 140 is extended for use, as shown in FIG. 1, the shelf 141 engages a lower surface of the side member 111d, and the support bar 142 supports a lower surface of the table 140. When the table 140 is folded, the hook 143 engages the support bar 142, as shown in FIG. 5.

Wheels 136, provided at the bottom of each leg 130, may include brakes to lock the device in place, if desired. Suitable wheels 136 can include swivel casters, for example.

It is to be understood that the assistive device for heavy tool operation is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An assistive device for heavy tool operation comprising:
   a rectangular frame, including first and second parallel, opposing side members, and third and fourth parallel, opposing side members, the third and fourth side members extending between and connecting the first and second parallel side members;
   a slot extending substantially along the length of the first side member;
   a plurality of holes defined in the first side member and spaced from the slot;
   a tool base including a shaft and a plurality of lockers extending normal to the shaft, the shaft configured to extend through the slot, and each locker configured for selective insertion in a selected one of the holes;
   a plurality of legs extending normal to the frame; and
   a plurality of wheels, each wheel attached to a respective one of the legs.

2. The assistive device for heavy tool operation according to claim 1, wherein the base lockers extend from an outer surface of the shaft.

3. The assistive device for heavy tool operation according to claim 1, wherein the base lockers are retractable and extend from an inner surface of the shaft.

4. The assistive device for heavy tool operation according to claim 1, further comprising a foldable table attached to the frame.

5. The assistive device for heavy tool operation according to claim 1, further comprising a counterbalancing weight base for supporting weight blocks thereon, the counterbalancing weight base being connected to the second side member.

6. The assistive device for heavy tool operation according to claim 5, wherein the counterbalancing weight base is inclined with respect to the second side member.

7. The assistive device for heavy tool operation according to claim 1, wherein one end of the third side member is pivotally attached to one of the side members of the frame and an opposing end of the third side member is releasably attached to another one of the side members of the frame.

8. The assistive device for heavy tool operation according to claim 1, wherein the legs have an adjustable height.

9. The assistive device for heavy tool operation according to claim 1, wherein the tool base includes an adapter plate configured to directly connect to a tool support arm.

10. An assistive device for heavy tool operation comprising:
    a rectangular frame, including first and second parallel, opposing side members, and third and fourth parallel, opposing side members, the third and fourth side members extending between and connecting the first and second parallel side members, the third side member being pivotally attached to the first or second side member;
    a slot extending substantially along the length of the first side member;
    a plurality of holes defined in the first side member and spaced from the slot;
    a tool base including a shaft and a plurality of lockers extending from the shalt, the shaft configured to extend through the slot, and each locker configured for selective insertion in a selected one of the holes;
    a plurality of adjustable legs extending normal to the frame;
    a plurality of wheels, each wheel attached to a respective one of the legs;
    a foldable table pivotally attached to the fourth side member.

11. The assistive device for heavy tool operation according to claim 10, wherein the tool base includes an adapter plate configured to directly connect to a tool support arm.

12. The assistive device for heavy tool operation according to claim 10, wherein the base lockers extend from an outer surface of the shaft.

13. The assistive device for heavy tool operation according to claim 10, wherein the base lockers are retractable and extend from an inner surface of the shaft.

14. The assistive device for heavy tool operation according to claim 10, further comprising a counterbalancing weight base for supporting weight blocks thereon, the counterbalancing weight base being connected to the second side member.

15. The assistive device for heavy tool operation according to claim 14, wherein the counterbalancing weight base is inclined with respect to the second side member.

* * * * *